Feb. 5, 1946.　　　　H. T. ODQUIST　　　　2,394,004
APPARATUS FOR WELDING SEAMS
Original Filed July 1, 1939　　5 Sheets-Sheet 1
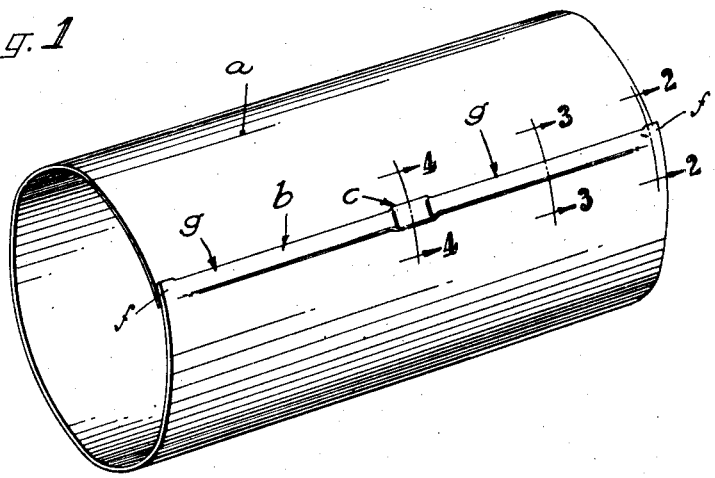
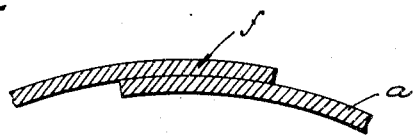
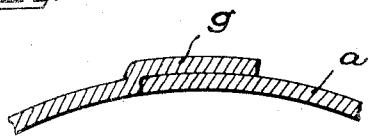
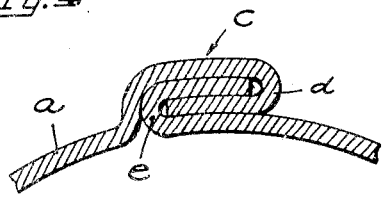
INVENTOR.
Harold T. Odquist
BY Ivan A. Thornburgh
Charles H. Clue
ATTORNEYS

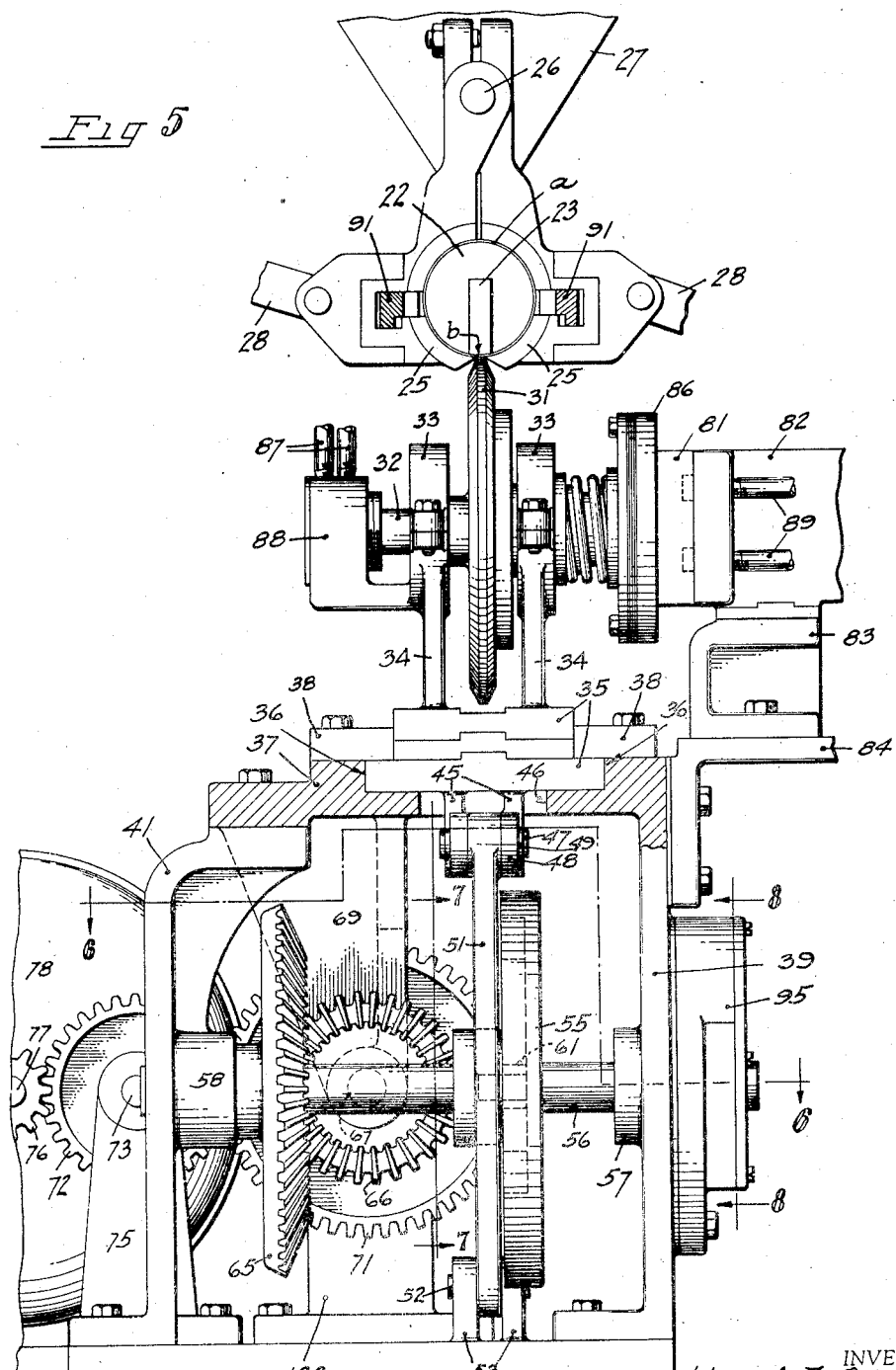

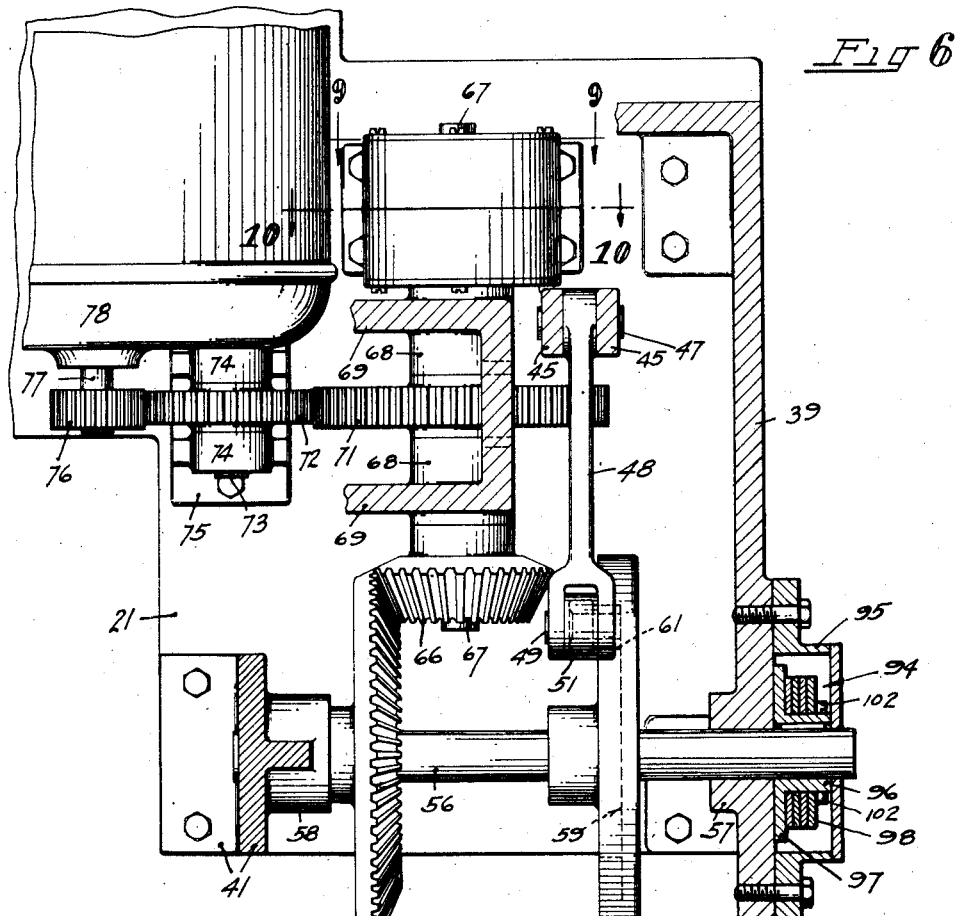

Feb. 5, 1946.   H. T. ODQUIST   2,394,004
APPARATUS FOR WELDING SEAMS
Original Filed July 1, 1939   5 Sheets-Sheet 4
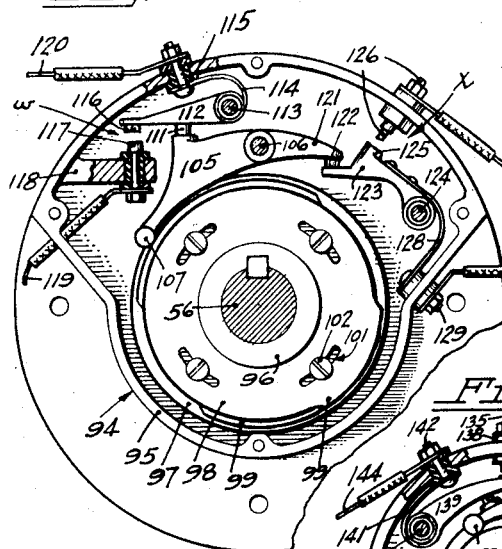
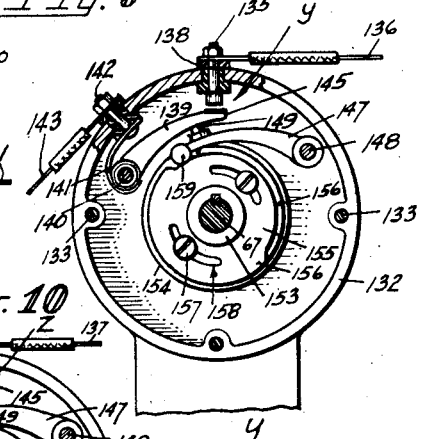
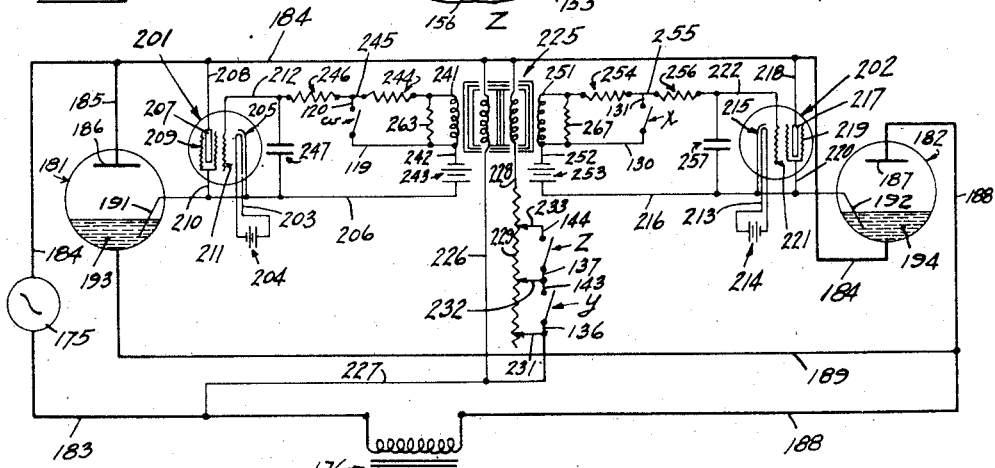
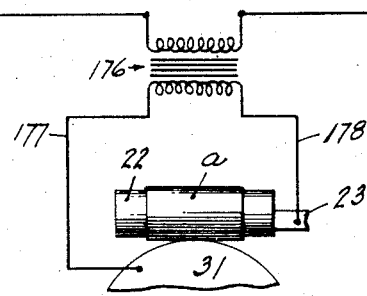
INVENTOR.
Harold T. Odquist
BY Ivan D. Thornburgh
Charles H. Cliff
ATTORNEYS Feb. 5, 1946. H. T. ODQUIST 2,394,004
APPARATUS FOR WELDING SEAMS
Original Filed July 1, 1939 5 Sheets-Sheet 5

INVENTOR.
Harold T. Odquist
BY Ivan D. Thornburgh
Charles H. Crue
ATTORNEYS

Patented Feb. 5, 1946

2,394,004

UNITED STATES PATENT OFFICE 2,394,004

APPARATUS FOR WELDING SEAMS

Harold T. Odquist, Yonkers, N. Y., assignor to American Can Company, New York, N. Y., a corporation of New Jersey Original application July 1, 1939, Serial No. 282,553, now Patent No. 2,323,349, dated July 6, 1943. Divided and this application October 27, 1942, Serial No. 463,527

2 Claims. (Cl. 219—4)

The present invention relates to an apparatus for resistance welding relatively thin sections of metal and has particular reference to the automatic welding of a seam or joint which is composed of sections requiring different welding treatments in a manner to produce a uniformly welded joint throughout its full extent. This is a division of my pending application Serial Number 282,553, filed July 1, 1939, in the United States Patent Office, and which issued as Patent Number 2,323,349 on July 6, 1943.

The welding of a side seam of a metallic can body which consists of a plain lap section, an offset lap section and a lock section may be considered as exemplification of work requiring varied welding treatment. Certain types of can bodies require a smooth even surface throughout the inside as where critical interior coating is necessary. An offset lap welded side seam presents the best interior surface for this purpose.

A small section of a welded lock seam of such a can may be desirable to assist in holding the can wall during welding, as this will insure uniformity in can diameter. A plain welded lap seam at an end of the side seam is better than the offset lap structure where such an end section is to be enclosed in a double seam as in the connection between the can body and an end member (such as a top or a bottom). Each of these different seam sections requires a different welding heat to produce a proper weld.

If a welding heat is supplied to the entire seam that is sufficient to weld the lock seam section, the offset lap section and also the plain lap section will receive too much heat and these parts will be burned. If a proper welding heat is supplied to weld the offset section, the lock seam portion will not be welded sufficiently and again the plain lap section will be burned. Obviously the application of welding power and heat which is proper for performing a weld of the plain lap section will leave the offset lap and the lock seam region unwelded.

Beside burning seam sections, where too great a welding heat is applied to the seam, such excessive heat has a destructive effect on the electrodes used, thereby resulting in a rapid deterioration of these members as well as causing other damage to the machine. On the other hand where the side seam of the can body is not properly welded, the resulting can will leak and be unsatisfactory as a container for certain products.

The present invention contemplates an apparatus for welding wherein a different welding energy is supplied to the different kinds of seam sections, such power being automatically delivered in predetermined amount in accordance with the predetermined requirements at any particular part of the seam being welded. This welding energy is under control of an electronic panel in which space discharge devices such as thyratron or ignition tubes are ionized by improved external means to effect properly timed conductivity of the tubes as required.

An object of the invention is the provision of an apparatus for welding sheet material by delivering welding energy to electrodes by an electronic control panel utilizing space discharge devices and electrically and mechanically effecting conductivity of the tubes in predetermined relation to the requirements of the section being welded so that the desired degree of welding heat is imparted to the work.

Another object of the invention is the provision of such a welding apparatus wherein the welding power delivered to the electrodes is adjustable, as to both quantity and timing, so that a particular welding operation is automatically obtained on work which by its nature requires a different welding treatment throughout different sections.

Still another object is the provision of a welding apparatus which is adapted to welding relatively thin metallic sheet material which varies in welding resistance throughout the part to be welded, the welding power being at all times under direct action of an electronic panel in which ionization of space discharge tubes, to render them conducting, is mechanically and electrically controlled in relation to the position of the electrodes on the sheet material being welded.

Yet another object is the provision of an apparatus capable of supplying the proper mechanical actions for delivering the proper amount of welding energy to the electrodes in accordance with the character of the seam sections passing into the zone of action of such electrodes.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a can body having a side seam formed of sections requiring different welding conditions and illustrating work adapted to be welded in the apparatus of the present invention;

Figs. 2, 3 and 4 are cross sections taken through the side seam along the respective section lines 2—2, 3—3 and 4—4 in Fig. 1;

Fig. 5 is a sectional view of some of the principal parts of a welding apparatus for performing a welding operation on a can body in accordance with the present invention, parts being broken away;

Fig. 6 is a plan sectional view taken substantially along the broken line 6—6 in Fig. 5;

Fig. 7 is a fragmentary detail taken along the line 7—7 in Fig. 5;

Fig. 8 is a sectional view on an enlarged scale showing one of the mechanical timing switches as taken substantially along the line 8—8 in Fig. 5;

Figure 12:
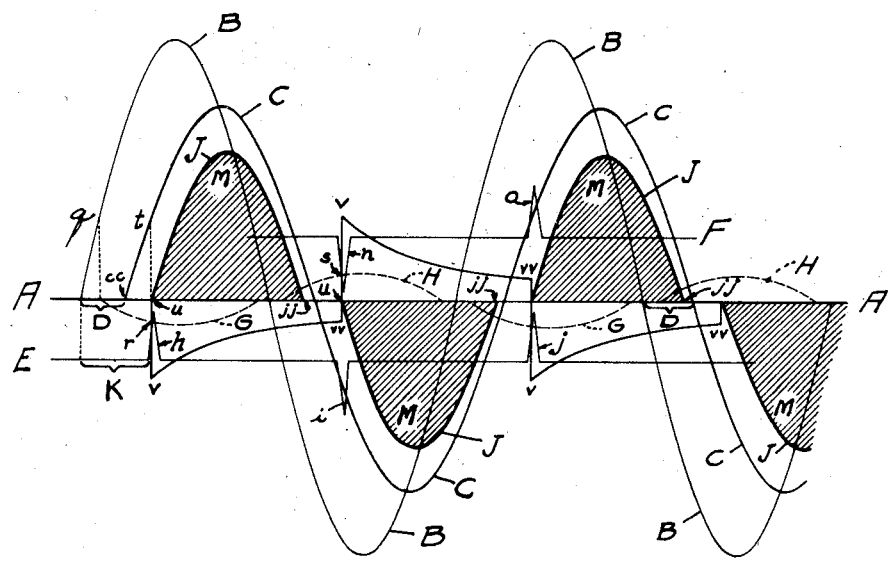
Figure 13:
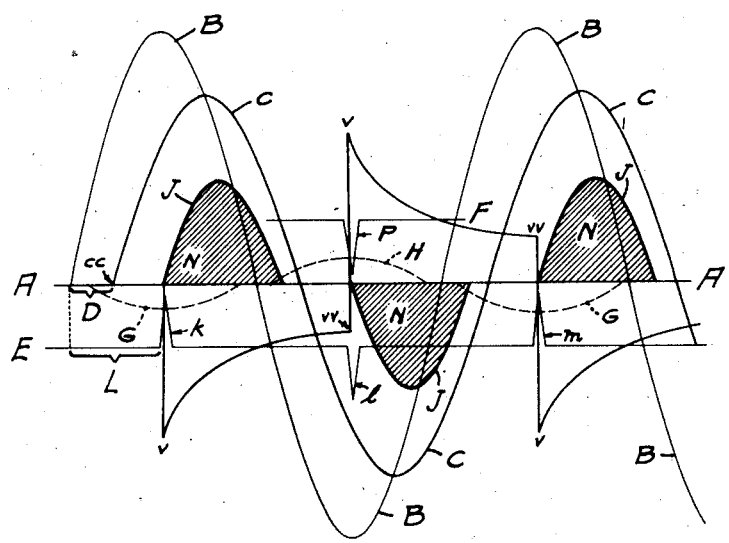

Figs. 9 and 10 are similar views of another of the switches as taken along the section lines 9—9 and 10—10 in Fig. 6 and on an enlarged scale;

Fig. 11 is a wiring diagram of the electrical circuits used in the apparatus; and Figs. 12 and 13 are diagrammatic views showing curves of various welding phases of the invention.

The present invention is directed to apparatus for welding by the use of certain improved switch and other electrical controls associated with the proper wiring and welding circuits utilizing space discharge tubes rendered conducting at predetermined time intervals to perform desired welding operations as required by the work, i. e., the parts being welded. As such a manner of welding is quite flexible under varying welding conditions, a type of work is selected which shows varied welding requirements and such a work will first be considered.

Fig. 1 illustrates a tubular can body $a$ circular in cross section and having a side seam $b$. This side seam is formed with a lock section $c$ at about its center which is produced by two distinct hooks $d$, $e$ (Fig. 4) interengaged and pressed tightly together. Such a lock section of the side seam requires a considerable amount of welding energy to produce a weld.

At each end of the side seam $b$ there is a plain lap section $f$ (Fig. 2) wherein one edge of the body is lapped over the other edge. Such a plain lap section requires the minimum of welding energy. The seam $b$ in other sections is lapped but in addition is offset which means that in these sections one part of the lap instead of being straight is bent to form an offset edge $g$ (Fig. 3). These sections require less welding energy than the lock section $c$ but more than the plain lap sections $f$.

It will be observed that on the inside wall of the sections $c$ and $g$ the meeting parts of the side seam are flush and this is the best construction when a coated inner lining is desirable for the can.

The principal parts of an apparatus embodying the invention are shown in Figs. 5 to 10, inclusive. The various machine parts are carried on a base 21. The can body $a$ to be welded is placed upon a horizontally disposed horn 22 (Fig. 5) in any suitable manner with the edges of the body, which are to form the side seam $b$, beneath the horn. An insert bar 23 is disposed in the horn and provides an inner, stationary electrode. This part 23 extends for the full length of the seam and slightly beyond the ends of the seam.

When the body $a$ is placed on the horn 22 it is firmly held in proper cylindrical or other shape against the outer surface of the horn by side wings 25. These may be hung from a pivot stud 26 projected out from the face of an upper frame 27. It will be understood that the bending of the blank into body form may be done by rollers, forming wings or by suitable forming or shaping mechanism common in can body making machines.

Actuation of the wings 25 may be imparted through the medium of links 28 pivotally connected to the wings and operable to clamp and hold the parts $c$, $f$ and $g$ of the side seam $b$ when in proper position for welding.

A movable electrode may be caused to traverse the side beam $b$ from one end to the other, such electrode engaging below the lapped and hooked parts of the seam during which time suitable welding energy passes between the movable electrode and the fixed electrode 23 in the horn and through the side seam parts therebetween.

Such a movable electrode is preferably a roller disc 31 mounted on a horizontal shaft 32. Shaft 32 is journaled in bearings 33 formed on bracket extensions 34 of a slide 35. This slide has longitudinal movement alongside and beneath the horn 22 but is insulated from the frame of the machine. It is retained in slideways 36 formed in a table 37. Slide gibs 38 are bolted to the table and these hold the slide 35 in its slideways 36. The table 37 may be a part of a frame 39 mounted on the base 21. A bracket 41 also mounted on the base 21 is shown in the drawings as supporting one side of the table.

The slide 35 is moved back and forth so that the roller electrode 31 traverses the seam to perform the welding. Suitable provision may be made for lowering the electrode 31 from its position relative to the horn 22 to more readily allow for positioning and removing of the can bodies before and after welding. This is a constructional detail which may assume various mechanical forms not of particular pertinence in the present disclosure.

As illustrated in Fig. 5 slide 35 is formed with depending lugs 45 which are adapted to move through a slot 46 cut in the table 37. These lugs 45 (see also Figs. 6 and 7) are pivotally connected at 47 to a link 48, the other end of which is pivotally connected at 49 to a vertically disposed rocker arm 51. The arm 51 is pivotally mounted at its lower end on a pin 52 which is carried in lugs 53 formed integrally with and projecting upwardly from the base 21.

The bodily sliding movement of the lower electrode 31 through the connection now being considered is effected by cam action and for this purpose there is provided a cam 55 which is carried on a horizontally disposed drive shaft 56 journaled in a bearing 57 formed in the frame wall 39 and in a bearing 58 formed in the bracket 41. A cam groove 59 (Fig. 7) cut in one face of the cam 55 provides actuation for a cam roller 61 mounted on a pin 62 disposed intermediately of the lever 51. As the cam 55 turns with the rotation of the shaft 56, the cam groove 59 controls the rocking movement of the lever 51 and, through the described connections, this produces a controlled reciprocating back and forth movement of the slide 35 and the lower roller electrode 31.

Drive shaft 56 is driven by a synchronous motor which insures constant and correct timing of the movements of the electrode and control switches with the welding current impulses. Shaft 56 carries a bevel gear 65 which meshes with a bevel pinion 66 carried on a horizontally disposed intermediate shaft 67. The shaft 67 is journaled in bearings 68 (Fig. 6) formed on the lower end of depending bracket members 69 which are preferably a part of the table 37.

The intermediate shaft 67 also carries a spur gear 71 which meshes with an idler gear 72 carried on a short shaft 73 which is journaled in bearings 74 formed in a bracket 75 mounted on the base 21. The gear 72 also meshes with a motor pinion 76 carried on a shaft 77 of a synchronous electric motor 78. This motor may also be mounted on the base 21.

The moving electrode 31 may be effective for welding during the forward stroke and after the welding is completed may be returned along its path of travel without doing any work or may weld in both directions. The exact timing of the welding current as it is delivered to the two electrodes 23, 31 and the exact amount of welding energy at any particular time in the welding cycle are under full control and will be more thoroughly discussed in connection with a consideration of the welding circuits shown in Fig. 11.

It might be said at this time that the electrical current is completed to the moving electrode 31 through a collector bar 81 (Fig. 5) which is mounted upon a bus bar 82 in turn carried on and insulated from an intermediate bracket 83. This bracket is supported from the frame 39 through the medium of a lower bracket 84. The bar 81 is stationary but electrical contact is made at all times between the lower electrode 31 and the bar irrespective of the position of the lower electrode relative to the seam being welded. The electrode shaft 32 at one side carries a spring pressed sliding disc 86 which engages against the inner face of the collector bar 81 and completes the circuit between the fixed frame parts and the moving electrode.

In high speed welding it is desirable to keep the electrodes cool to prevent overheating under constant repeated welding conditions and a cooling medium may be circulated through parts of the electrode and through parts of the bus bar to effect such cooling. This is a detail which is only incidental to the present invention but such a cooling system is suggested by pipes 87 threaded into a housing 88 which encloses one end of the electrode shaft 32. A cooling medium such as cold water may be circulated through the housing and the heat of the electrode will be dispersed to sufficient extent by such cooling arrangement. Pipes 89, carried in the bracket 82 and leading into the bus bar 81, may be used as part of the circulatory cooling system in the same manner.

The details of the welding horn 22 are not embodied in the present disclosure as such a horn may take on a variety of shapes and constructions. In most cases it will be desirable to make the horn collapsible so that after a body a has been welded it may be more easily slid off the horn. Slide bars 91 are illustrated in Fig. 5 and are shown as being transversely mounted in the holding jaws or side wing members 25 to suggest this removal of a welded can body from the horn. Such bars may also be used to feed the open can body into welding position.

In carrying out a complete welding cycle according to the present invention it is necessary to vary the input to the welding transformer which supplies the welding energy in accordance with the requirements of the several sections of the seam, mechanisms for this purpose taking the form of mechanical switches by means of which the constants of the control circuit may be changed. Fig. 8 and Figs. 9 and 10 illustrate details of two different switch devices which are used for this purpose.

The switch device illustrated in Fig. 8 and designated broadly by the numeral 94 is a double pole switch, i. e., two different circuits are simultaneously affected. This switch unit is contained within a housing 95 secured to one side of the frame 39 (see also Figs. 5 and 6). The actuating parts of this switch unit are carried on the drive shaft 56, being mounted on a sleeve 96 which is keyed to the shaft. Adjacent the frame wall 39 the sleeve 96 is enlarged in a flanged head 97.

Four cam rings 98 are loosely mounted on the sleeve, alongside one another, and these rings may be independently adjusted as to position on the sleeve. Each ring has a peripheral projecting cam surface 99 which functions as a switch actuator and it is the proper positioning of this projecting part that determines the timing of the switch unit in the welding cycle.

Each cam ring 98 is cut through in four arcuate slots 101 and bolts 102 passing through the slots are threaded in the flange head 97 of the sleeve. When the desired adjustment is made the bolts are clamped tight and the four cam rings are locked as a unit to the sleeve 96 and thereupon turn with the shaft 56.

The two inside cam rings work together as a switch actuator for effecting welding of one can body and the two outside cam rings also cooperate for the next following can body. In other words, the cam surfaces 99, either of the two inside cam rings or of the two outside rings when set, provide a larger diameter periphery 99 for the pair which opens the contacts at a certain time in the rotation of the drive shaft 56 for the beginning of a weld, which maintains the contacts open until the full seam has been welded and which terminates welding by closing the contacts at a certain time.

It will now be evident that there are two circuit openings and two circuit closing actions for the switch unit during one revolution of the drive shaft 56. In other words, only one half of a revolution of the drive shaft is used for one can body and the welding of two can bodies takes place during one entire shaft revolution.

A switch lever 105 is pivotally mounted at 106 on the housing 95. One arm of lever 105 terminates in a widened rounded cam section 107. This section extends across the four cam rings 98 and therefore rides upon the peripheral surface of one or more of the rings, either on the cam projections 99 or on the reduced peripheral surface of the four ring cams which are the same diameter in their reduced non-projected sections.

The switch lever 105 at all times engages an insulated block 111 fastened to an arm 112 which is pivotally mounted on an insulated bushing surrounding a pin 113 anchored in the housing 95. Arm 112 is urged in a counter-clockwise direction by a curved leaf spring 114, the opposite end of which is secured to an insulating block 115 fixed on the housing. The free end of the arm 112 carries a contact 116 which, when the switch lever 105 is in circuit closing position, rests on a contact pin 117. Fig. 8, however, shows the contact elements separated and this part of the switch open.

Pin 117 is anchored in an insulated sleeve which is carried on an arm 118 formed as a part of the housing 95. A wire 119 connects with the pin 117 and is insulated from the housing. The spring 114 is also secured to a wire 120. The two wires 119, 120 constitute a part of one of the electrical circuits which will be more fully described in connection with the wiring diagram. This part of the switch will be designated by the letter w in the later description.

The switch lever 105 is formed with a tail extension 121, the end of which at all times rests against an insulated block 122 fastened to an arm 123. Arm 123 is pivoted on a pin 124 secured in the housing 95. The free end of the arm 123 carries a contact 125 which, when the switch lever 105 is in circuit closing position, engages a contact pin 126. Fig. 8 shows these contact elements also separated. Pin 126 is anchored in an insulated sleeve which is carried in the housing 95.

A curved leaf spring 128 connects with the arm 123 and urges the arm in a clockwise direction. This spring, when the parts are in circuit closing position, holds the contact 125 and the pin 126 in contact. The spring 128 is mounted on a pin 129 carried in an insulated sleeve which is secured in the housing. The pin 126 is connected at all times with a wire 130 and a wire 131 connects with the pin 129 and the spring 128. These two wires form a part of a second circuit to be described later in which this part of the switch will be designated by the letter $x$.

It will be understood that the switches $w$ and $x$ are simultaneously closed. They are also simultaneously opened when one of the projections 99 of a cam ring passes into engagement with the part 107 of the switch lever 105, as shown in Fig. 8. Such engagement rocks the switch lever clockwise simultaneously lifting the arm 112 and lowering the arm 123 and separating the contact elements involved. Welding takes place when these two switches $w$ and $x$ are open, as will be fully explained hereinafter.

The switch devices shown in Figs. 9 and 10 are of substantially the same construction and the operation in each case is the same. Each switch has a single make-and-break action, Fig. 9 illustrating a switch which is referred to by the letter $y$ and the switch of Fig. 10 is designated by the letter $z$. Both switches are mounted upon the intermediate shaft 67 (Fig. 6) alongside one another. Each is enclosed in a switch casing 132 mounted on the base 21 (see also Fig. 5). The two may be tied together by bolts 133.

The shaft 67 is faster running than the switch actuating drive shaft 56. The entire cycle of welding for each can body takes place during a single revolution of the shaft 67. Each switch $y$ and $z$ is independently adjustable as to timing so that in each switch an electric circuit is established at the desired time by closing of contacts within the switch. Such contacts remain closed for the desired time period, following which the contacts are separated and the corresponding circuit is broken.

The single circuit for each switch is a shunt circuit which controls, in cooperation with the other switch circuit, the amount of welding energy delivered to the electrodes so that when minimum, intermediate or maximum welding heat is required by the nature of the work, such requirements will be met. It will be understood that additional switches of this type may be used if there are more than three intensities of welding heat required. This will be fully explained hereinafter.

The same corresponding part numbers for the two switches $y$ and $z$ will be used as long as they are substantially the same construction. Each switch is permanently connected to a wire at a contact pin 135. In the switch $y$ (Fig. 9) this wire is designated by the numeral 136, while a wire 137 (Fig. 10) joins the contact pin 135 in the switch $z$. The contact pin 135 of each switch is anchored in an insulated sleeve 138 which is secured in the casing 132.

A switch arm 139 (Figs. 9 and 10) is pivotally mounted on an insulated sleeve carried on a pin 140 secured in the housing. The switch arm of each switch is connected with a curved leaf spring 141 which urges the arm in a clockwise direction. For this purpose, the opposite end of the spring is mounted on an insulated sleeve which is secured on a pin 142 in the housing. The pin 142 electrically connects the spring 141 with a wire. In the switch $y$ (Fig. 9) this wire is marked 143, while a wire 144 connects with the pin in the $z$ switch of Fig. 10.

An electric connection is made between the wires 136 and 143 for the switch $y$ and between the wires 137 and 144 for the switch $z$ when a contact pad 145, carried on its switch arm 139, is brought into contact with the contact pin 135. The making and the breaking of each of the circuits between the contact parts 135, 145 is effected by moving the switch arm 139.

A switch lever 147 (Figs. 9 and 10) is used for such a purpose and when the lever moves the arm, the associated spring 141 in each switch housing 132 is flexed. Lever 147 is pivoted at 148 to the housing and an intermediate upper part engages an insulated block 149 which is fastened to each switch arm 139. The switch spring 141 keeps the block against the switch lever at all times.

The shifting of the switch lever 147 and through it the movement of the arm 139, is effected by cam action. When either switch $y$ or $z$, therefore, is closed through the respective circuits involving the wires 136, 143 and the wires 137, 144, the cam action is applied against the switch lever 147 and the lever moves the switch arm 139, its spring 141 yielding to permit such a movement. The cam action will first be explained.

Within the switch housing 132 of each of the switches $y$ and $z$, a sleeve 153 is keyed on the shaft 67. This sleeve is formed at one end in an enlarged flanged head 154. Two cam rings 155 are mounted on the sleeve 153 one against the other and the adjacent ring rests against the sleeve head 154. Each cam ring has a peripheral projecting cam surface 156 which functions as a switch actuator to close the switch.

Each cam ring 155 is adjustable as to timing position on the sleeve 153, the two projecting cam surfaces 156 forming a continuous surface. In switch $y$ (Fig. 9) this surface is nearly 180° in extent. In switch $z$ (Fig. 10) it is only a few degrees long. The reason for this will be made clear when the wiring and the circuit operations are explained.

When the rings 155 have been properly positioned they are locked together and are also clamped to the sleeve flange 154 by bolts 157. Arcuate slots 158 cut in the rings permit the individual adjustment of the rings.

The switch lever 147 is provided with a widened rounded section 159 which extends across both of the cam rings 155. The switch spring 141 also keeps the switch lever projection 159 down against the periphery of one or both of the cam rings.

When the normal or lesser diameter of the rings is passing the switch lever, this lever for the switch $y$, is down in the position of Fig. 9. The same position is shown in Fig. 10 for the switch $z$. At such a time the pad 145 and the contact pin 135 are separated. Where this condition prevails in switch $y$ the circuit including the wires 136, 143 is broken.

In switch $z$ this condition means a break in its circuit including the wires 137, 144. As soon, however, as the cam ring projecting surface 156 engages the switch lever 147, the latter is lifted, the contacts are brought together and the circuit as to that particular switch is closed. Obviously the switch $y$ is closed for a much longer time than the switch $z$. This difference is occasioned by the different length of the seam sections $f$ and $g$ as will be later explained.

Reference should now be had to the wiring diagram of Fig. 11 for a clearer understanding of the welding circuits and of the results of the functioning of the various switches in their special timing. All of these controlling elements in the primary of the welding circuit act so that the secondary welding circuit containing the electrodes 23, 31, will deliver welding energy which is proper for the work to be welded and which is effective only during the desired welding cycle.

In the wiring diagram of Fig. 11, the numeral 175 indicates the electric generator which supplies electrical energy as an alternating current to a welding transformer 176. The secondary winding of such a transformer extends as a wire 177 to the lower or movable electrode 31. This broad statement of electrical connection is sufficient for the present purpose. It will be recalled that from a mechanical standpoint, various connecting mechanical units such as the bus bar 81 (as shown in Fig. 5), sliding disc 86 and other connecting elements are included in this electrical connection with the lower electrodes.

The other side of the welding transformer's secondary winding extends as a wire 178 to the upper or fixed electrode 23. The welding energy is therefore the usual transformed welding impulse which results, in time and amount, from the electrical energy entering the primary winding of the transformer 176. It is to the more accurate control of the kind as well as the timing of such energy that the present invention is in large part directed.

Ignitron control tubes of the mercury pool type are used in this primary circuit of the welding transformer 176. Such tubes may be of the type disclosed in United States Patent 2,069,283, issued February 2, 1937, to the Westinghouse Electric and Manufacturing Co. on Electric arc device. Two such control tubes 181, 182 are used jointly as a switch to interrupt the current between welds and as a control device to lower the power supplied to the welding transformer 176 during certain phases of the welding cycle.

A wire 183 connects one side of generator 175 with one side of the primary winding of the transformer 176. A wire 184 connects the other side of the generator with the cathode of the tube or ignitron 182. A wire 185 connected between the wire 184 and the anode (indicated by the numeral 186) of ignitron 181, gives a joint connection between tubes 181, 182. The anode of ignitron 182 (which is numbered 187) is joined by a wire 188 to the other side of the primary winding of the transformer 176 and a wire 189 connected between the wire 188 and the cathode of ignitron 181, provides the other part of the joint connection between the ignitron tubes.

When the ignitrons 181, 182 are caused to conduct, current flows through one or the other, depending upon which half of the voltage cycle is flowing through the alternating current circuit and the transformer. Such a primary current is thus transformed as a welding current effective for welding the side seam $b$ of the can body $a$ on the horn 22 by utilization of the electrodes 23, 31.

The ignitrons are caused to conduct by creating currents between igniters 191, 192 of the respective tubes 181, 182 and mercury pools 193, 194 contained in the tubes. Such creating currents ionize mercury vapor at the surfaces of the pools, as is well known in this art, and negative ions and arcs are established. At a time when a mercury pool 193 or a pool 194 is negative, the anode 186 or the anode 187 will be positive with respect thereto and hence such positive anode will attract the negative ions.

One or the other of the ignitrons 181, 182 thus conduct for each half cycle of supply voltage. The ignitron whose anode is sufficiently positive at any instant thus constitutes the conducting tube at such time the other tube is held back during that half cycle since its voltage is reversed.

Firing tubes 201 and 202 are used for control of the igniters 191, 192. An igniter may be given a potential with respect to its mercury pool at a time when the associated anode of the ignitron is positive, by imposing a potential of the same sense as the anode with respect to its cathode pool by means of the conduction of a firing tube. Such an operation connects the igniter to the anode with only a slight resistance drop through the firing tube.

The firing tubes 201, 202 are preferably of the hot cathode grid controlled thyratron mercury vapor type. A firing tube very similar in construction and operation is disclosed in United States Patent 2,106,831, granted February 1, 1938, to Westinghouse Electric and Manufacturing Company on Electric control system. The firing tubes 201 and 202 will now be considered.

Firing tube 201 contains a heater element which is indicated in the drawings as a closed circuit 203 and which for the sake of simplicity is shown as including a battery 204 which is indicative of an independent source of power. In commercial practice the proper transformer with the connecting wire would undoubtedly be used with the power line instead of the battery.

The heater element within the tube is preferably surrounded by a cathode member 205 which may be connected to a wire 206. A plate anode 207 is also provided and may be connected by a wire 208 with the generator wire 184. Such an anode 207 is preferably shielded by a screen grid 209 which may be joined by a wire 210 to the wire 206.

The control grid member of this firing tube is indicated by the numeral 211 and is disposed between the cathode and the plate anode. Such a grid may be connected to a wire 212. This construction of tube with its screen grid provides a high impedance grid to anode circuit so that only small grid currents will flow.

In like manner the firing tube 202 is constructed with heater, cathode and grid elements. Its heater element is indicated in Fig. 11 as a closed circuit 213 which in this exemplary disclosure includes a battery 214. Within the tube, the heater element is surrounded by a cathode member 215 which may be connected to a wire 216.

A plate anode 217 is also provided and may be connected by a wire 218 with the generator wire 184. Such an anode 217 is preferably shielded by a screen grid 219 which may be joined by a wire 220 to the wire 216. The control grid member of this firing tube is indicated by the numeral 221 and is disposed between the cathode and the plate anode. Such a grid is connected to a wire 222.

Proper operating conditions are effected in the firing tubes 201, 202 and also in the control tubes 181, 182 by the use of a peaking transformer 225. Transformer 225 has two primary and two secondary windings. It is constructed with a high reluctance magnetic path in the core on which the secondary windings are placed.

Accordingly as the flux rises in the core due to the inductive effect of primary current, magnetic saturation of the core path passing through the secondaries is quickly reached and the result is a series of sharp peaked voltage waves occurring in the secondary circuits in definite phase relationship with the sine wave or approximate sine wave of the voltage applied to the primaries. This will be discussed more in detail in the later consideration of the wave diagrams of Figs. 12 and 13.

Voltage in the secondary of a transformer is dependent upon rate of change of magnetic flux in the core and the wave front of the secondary voltage is very steep. In the present invention accurate control of the phase relation of this peaked wave to the anode voltage of the firing tubes 201, 202 is had and firing of the tubes is accurately held to the desired point in the anode voltage wave. This also will be further discussed in connection with the welding phase curves of Figs. 12 and 13.

Peaking transformer 225 has one primary winding one end of which terminates in a wire 226 and the other end joins with the generator wire 184. The wire 226 connects with a wire 227, which in turn is connected with the generator wire 183.

The other primary winding of the transformer terminates at one end in a wire 228 and the other end of this primary winding connects with the generator wire 184. The wire 228 joins a resistance coil 229.

The power factor of a circuit containing resistance and reactance is dependent upon the ratio of the former to the latter. A transformer is largely an inductive reactance hence the power factor of a circuit including such a transformer will be relatively low. However, the power factor of a pure resistance is unity so that by introducing a resistor, which is practically non-inductive, in series with the primary of a transformer, the overall power factor of the combination is greater. Thus the phase of current in the circuit relative to the voltage applied across the circuit may be changed by varying the value of the series resistance.

A change in the phase of the current in the primary of a transformer produces a like change in the secondary voltage. It is this principle of introducing a resistor in the primary of the peaking transformer which is utilized in the particular circuit illustrated in Fig. 11 and which is now being described as exemplifying a vital principle of the invention, that of shifting the phase of the sharply peaked voltage waves induced in the peaking transformer 225.

The coil 229 constitutes a phase shifting resistor. The control switches y and z are electrically associated with this coil and with each other. An end sliding contact element 231 joins with the wire 227 and is movable along the coil. Current flowing through the transformer primary by way of the wire 228, the coil 229, element 231 and wire 227 is subjected to the resistance in the intermediate length of the coil. The amount of resistance is varied by the position of the contact element and the portion of the coil used, this being true of all sliding contact resistance constructions.

This amount of resistance is further momentarily varied at will by closing both or one of the switches y and z. This closing of a switch partially shunts out the resistor. By having both switches closed still another different resistance is made effective. If more variations of resistance is desired other switches may be added. The wire 136 of the switch y connects with the wire 227 at the end which joins with the contact element 231. The other switch wire 143 joins with an intermediate sliding contact element 232 also movable along the coil.

The wire 137 of the switch z joins the wire 143 at its point of juncture with the intermediate contact element 232 and the other switch wire 144 is connected to another sliding contact element 233. The element 233 is also movable along the coil 229. By this arrangement the desired amount of welding energy is made available at any particular time so that various welding conditions in the work being operated on can be met by the proper welding heat at the proper time.

Three different welding conditions are herein given by way of example but obviously more or less can be handled as desired. The adjustment of each of the sliding contact elements 231, 232 and 233 is made according to the requirements of the work being welded. The different welding energy needed in the welding of a side seam b of the can body a, in the example given, will be briefly considered in connection with this sliding contact adjustment and with the functioning of the switches y, z.

The center part c of the side seam b requires the maximum welding energy and this figure will determine the positioning of the sliding contact 231 in its relation to the coil of the resistance 229. When this maximum welding energy is being used both switches y and z are open.

In other words, neither of these switches has any effect on the welding operation and the full amount of determined resistance will be that offered by the coil winding from the connection with the wire 228 to the contact 231. Obviously the thickness and the kind of metal of the blank will be factors in this determination of the proper welding heat needed.

When the movable electrode is in contact with the offset lap section g of the side seam b, the proper welding energy needed will be less than the maximum and a lesser length of resistance coil 229 will be used. Without changing the position of the sliding contact 231, which remains set as long as the same kind of blank is being welded, that part of the coil length not needed will be taken out by short circuiting through the switch y. To adjust for this amount therefore it is only necessary to properly position the intermediate sliding contact 232 on the coil to obtain the desired lesser welding heat.

The minimum welding requirements are for the plain lap sections f of the side seam b. This means that a lesser length of resistance 229 is needed and the sliding contact 233 is accordingly set relative to the coil so that the needed lesser amount of resistance for the desired welding energy is obtained by further short circuiting the resistance length. This is done by closing the switch z which now works with the closed switch y to short cut the resistance not needed. It will be observed that this setting is done without changing the setting of either of the sliding contacts 231 or 232.

From what has just been explained, it will now be evident by referring to both Figs. 1 and 11 that the welding of the side seam b from end to end is controlled by variation of the effective resistance length of the coil 229 as follows. In the beginning of the weld with the plain lap section f, the effective resistance length is from the wire 228 to the contact 233, both switches y and z being closed. The offset lap section g is welded with an effective length of the resistance 229 as the distance from wire 228 to the intermediate contact 232, the switch y being closed. At c the effective length is from the wire 228 to the contact 231, both switches y and z being open. Continuing onto the offset lap section the effective resistance length is again from the wire 228 to the contact 232. Finally the exit and lap f for the seam is made with the short distance of the resistance from the wire 228 to the contact 233.

From the foregoing it will now be readily seen why the projecting cam surface 156 is long in switch y (Fig. 9) and relatively short in switch z (Fig. 10). Switch y is closed while the two plain lap sections f and the two offset lap sections g are being traversed by the movable electrode, and will remain closed during positioning of a new body to be welded and during removal of the body after welding. The switch z on the other hand is closed during welding of the two lapped sections f of the seam b and will also remain closed during positioning of a new body to be welded and during removal of the body after welding. Obviously, this timing of the switches is a matter of adjustment as already fully explained.

The preceding reference to the peaking transformer 225 and to other associated elements has already dealt with the primary circuits of such transformer. The two secondaries of the peaking transformer will now be further considered and the relationship between transformer secondary circuits and the firing tubes 201 and 202 will be closely examined.

The grid-cathode circuits of the firing tubes 201, 202 are fed by the secondaries of the peaking transformer. Tube 201 is thus connected with a secondary winding 241 (Fig. 11) of the peaking transformer. One end of the winding of secondary 241 is joined by a wire 242 to a battery 243, the other side of the battery being connected to one end of the wire 206. The opposite end of wire 206 terminates at the igniter 191 to which it is connected and is also joined to cathode 205, this completing the grid-cathode circuit.

The opposite end of the secondary winding 241 is connected to one side of a resistor 244, the other side being connected by a wire 245 to the adjacent side of another resistor 246. The opposite side of resistor 246 is joined to the grid wire 212. Normally a suitable negative direct current bias is maintained on the grid of the firing tube 201 by the battery 243. Obviously other current sources could be used but for the sake of simplicity such a battery arrangement is adequate for the present desired results.

All grid biasing voltages for the firing tube 201 must flow through the resistor 246 and may or may not flow through the resistor 244. Resistor 246 therefore acts as a current limiting device and prevents destructively high currents from flowing through the grid.

A capacitor 247 is interposed between wires 206 and 212 and acts to absorb any transient voltage by shunting of the grid-cathode circuit. Such transient voltage might be induced in the grid circuits due to transients occurring in the anode-cathode circuit. This feature also helps maintain the grid at a predetermined potential with respect to its cathode.

Before proceeding further with a description of operation of welding, it is advisable to briefly note the parts associated with the firing tube 202. These parts correspond in every particular to the parts of the firing tube 201. Tube 202 is connected with the other secondary winding of the peaking transformer. This secondary is designated by the numeral 251.

One end of winding 251 is joined by a wire 252 to a battery 253 the other side of the battery being connected to one end of the wire 216. The opposite end of wire 216 terminates at the igniter 192 to which it is connected and is also joined to cathode 215 thus completing the grid-cathode circuit.

The opposite end of the secondary winding 251 is connected to one side of a resistor 254, the other side being connected by a wire 255 to the adjacent side of another resistor 256. The opposite side of resistor 256 is joined to the grid wire 222. Normally a suitable negative direct current is maintained on the grid of the firing tube 202 by the battery 253.

All grid biasing voltages for the firing tube 202 must flow through the resistor 256 and may or may not flow through the resistor 254. The resistor 256 thus prevents destructively high currents from flowing through the grid.

A capacitor 257 is interposed between wires 216 and 222 and acts to absorb any transient voltages by shunting of the grid-cathode circuit. This capacitor 257 operates in every way analogous to the companion capacitor 247 for the other firing tube and these various features need not be again repeated.

As shown in Fig. 11, wire 119 of switch w is connected to that side of the peaking transformer secondary 241 which joins with the wire 242. The switch wire 120 also connects the switch with the wire 245. A shunt resistor 263 is interposed between the end of the secondary winding 241 and the wire 119.

In like manner the wire 130 of switch x is connected to that side of the peaking transformer secondary 251 which joins with the wire 252. The other switch wire 131 also connects the switch x with the wire 255. A shunt resistor 267 is interposed between the end of the secondary winding 251 and the wire 130.

The series resistors 244, 254 and the shunt resistors 263, 267 act to reduce switching transient and resultant arcing when switches w and x are opened or closed.

It will be obvious from the foregoing that by virtue of the connection between wire 206 and its associated cathode 205 of the firing tube 201, that a grid cathode circuit has been established which includes the bias battery 243 and the peaking transformer secondary 241 and the wires and other parts connected therewith. Under conditions where no weld is being made the bias battery 243 maintains the grid 211 at a potential sufficiently negative with respect to the cathode 205 to prevent an electron stream from cathode 205 reaching the anode plate 207.

At such a time of no welding the switch *w* is closed and shunts out any effective voltage from the secondary 241. The grid-cathode circuit then includes wires 242, 119, switch *w*, wires 120, 245, resistor 246, grid wire 212, the grid 211, cathode 205, wire 206 and battery 243.

The same corresponding condition obtains as to firing tube 202, the switch *x* being closed as to such a circuit during a no-welding operation. When switches *w* and *x* are opened the firing tubes will be caused to conduct each time the transformer windings' secondary voltage waves become sufficiently positive during the positive half cycle to overcome the negative voltage of the bias batteries and to raise the potentials on the control grids to sufficiently positive values to allow a conducting path to be established between cathode and anode.

Consider now the circuit during welding for the firing tube 201, at which time the switch *w* is opened. The grid cathode circuit is now constituted by secondary 241, resistor 244, wire 245, resistor 246, grid wire 212, grid 211, cathode 205, wire 206, battery 243 and wire 242. The firing tube 201 now conducting current to the ignitron 181 for the purpose of starting a weld, a conducting path is established between the cathode 205 and the plate anode 207. In this new circuit there is now included wire 184, 208, plate anode 207 and cathode 205 of the firing tube 201, wire 206, igniter 191, the mercury cathode pool 193 of the ignitron, wires 189, 188, primary of welding transformer 176, wire 183 and the generator 175.

Since the peaking transformer is properly phased with respect to the tube 181 there will at this time be a positive potential appearing on the anode 186 with respect to the cathode 193. This positive potential brought to the igniter 191 by the conducting of firing tube 201 produces a high potential gradient at the surface of the cathode mercury pool and establishes therewith an arc as described in the Westinghouse Patent 2,069,283, supra.

The striking of this arc produces a highly ionized condition within the ignitron tube and the main arc between anode and cathode is established. This tube now conducts power from the generator 175 to the primary of the welding transformer 176, as previously described, for approximately one-half cycle.

The same firing conditions prevail as to firing tube 202 and the ignitron 182. If switch *x* is allowed to remain open at the end of the ionizing condition just described for ignitron 181, the firing tube 202 conducts and causes the ignitron tube 182 to conduct in the same way as that of ignitron tube 181. Thus it will be understood that as long as switches *w* and *x* remain open, the ignitron tubes 181, 182 conduct alternately and the welding will thus proceed in accordance with the welding energy delivered as determined by the switches *y* and *z*.

It will be recalled that the statement was made above that a series of sharp peaked voltage waves occur in the secondary circuits of the peaking transformer 225. There was also the further statement that such peaked waves bear a definite controllable phase relationship to the sine wave or approximate sine wave of the voltage on the primaries of the transformer. This now will be examined in connection with Figs. 12 and 13.

Control of the phase relation of the various circuits being an outstanding feature of the present invention, the phase shifting for the different kinds of welding will be graphically compared. In the example of work for welding given in the preceding description and shown in Fig. 1 as seam parts *f*, *g* and *c*, the welding energy required for the plain lap *f* is the minimum, that for the part *g* is next or an intermediate energy and for the section *c* the maximum welding energy.

In the wave diagrams of Figs. 12 and 13 only two of these three welding conditions are shown and it is believed that this is adequate for the present purposes since the actual curves and absolute phase shifting angles are unimportant to the description. The comparison between or the relative values of a higher welding heat and a lower welding heat are important.

For this explanation it will be assumed therefore that Fig. 12 shows the various current behaviors when the seam part *c* is being welded, this being for maximum welding heat in the example given. Fig. 13 can then be considered as graphically showing a lesser welding heat requirement which may be for either the seam parts *f* or *g*. It will be assumed arbitrarily therefore that the curves of Fig. 13 show the welding of the plain lap seam sections *f*. From this it follows that the intermediate welding curves for the seam sections *g*, while not specifically shown, nevertheless come somewhere between the curve positions of Figs. 12 and 13.

In both Figs. 12 and 13 the units of time are plotted as abscissa and units of voltage and amperes are plotted as ordinates. The line A—A is the zero or axis line. B designates the sine wave of the voltage appearing across anode to cathode of the firing tubes 201, 202.

Curve C is also a sine wave and is herein used to represent what would be a current wave through the primary winding of the welding transformer 176 if all tubes were fired to correspond with the overall natural power factor of the entire welding circuit. The distance marked D indicates the time lag or electrical phase angle corresponding to this natural power factor.

The horizontal lines marked E and F represent the negative bias normally maintained on the control grids 211, 221 of the firing tubes 201, 202 by means of the batteries 243, 253. The E line is below the zero axis line A—A and represents a voltage applied to the tube capable of conducting in the positive half cycle. Line F is above the zero axis line and represents the bias voltage associated with the other firing tube which is capable of firing during the negative half cycle.

On lines E and F there are shown the sharp peaks in the voltage waves just mentioned. These peaks on line E are lettered *h*, *i*, *j*, in Fig. 12 and *k*, *l*, *m* in Fig. 13 and represent peaked voltage produced by one of the peaking transformer secondaries 241 or 242. On line F the peaks produced by the other of the transformer secondaries are lettered *m* and *o* in Fig. 12 and *p* in Fig. 13.

Only those peaks acting in the positive direction, such as $h$, $j$, $k$, $m$, $n$ and $p$ are of use in reducing the negative grid bias to or below the critical grid bias of the firing tubes 201, 202. Such critical grid bias is indicated by dotted curve lines G and H in both Figs. 12 and 13.

The critical grid bias represented by the lines G and H is derived from the characteristics of the individual tubes and will start at points corresponding to minimum arc establishing potential required for zero bias with a particular tube. This is graphically shown in Fig. 12 as a point $q$. When these critical grid biases are exceeded by the superimposed peaks, graphically shown as points $r$ and $s$, the firing tubes 201, 202 will pass current. A few micro-seconds later, this current passing through the igniter 191 or 192 of its corresponding ignitron tube 181 or 182, causes that tube to conduct.

When a voltage peak, $h$ or $n$, for example, reduces the bias below the critical value, as at a point $r$ or $s$ and the tubes fire, current will tend to start as at a point $t$ in Fig. 12. Since magnetizing current for the welding transformer has not previously been supplied, a transient current occurs in the reverse direction tending to oppose the normal direction of current flow. This is indicated by the sudden rise from a point $u$ to a point $v$.

Such a transient dies out logarithmically as from the point $v$ to a point $vv$ and would eventually become zero, were it not for the firing of the opposite pair of tubes. The actual current conduction loop, lettered J, is the algebraic sum of the natural conduction loop C and the transient loop $v$ to $vv$.

The actual current does not continue beyond the zero value point, marked $jj$ in Fig. 12, even though the transient has not yet reached zero as the tubes are capable of conducting in only one direction.

Comparing now Fig. 13 with Fig. 12 in which the corresponding curves are located in accordance with the different welding heats used, it will be observed that a distance K (Fig. 12) of the greater welding heat is less than a distance L (Fig. 13) of the lesser heat. This distance which represents the phase shift between the axis beginning of the voltage sine wave B and the axis beginning of the current conduction loop J, graphically illustrates the effect of changing the resistance of the coil 229 (Fig. 11) by closing the switches $y$ and $z$. The phase of the secondary voltage of the peaking transformer 225 in respect to the sine wave B is retarded when switches $y$ and $z$ are closed.

It now follows that the loops of the curve J in Fig. 13 graphically represent pulses of current through the welding transformer 176 under this retardation of the control phase. The loops of the curve J of Fig. 12, on the other hand, represent pulses of current through the welding transformer when the resistance coil 229 is operating at its maximum resistance for the maximum welding requirements of can body seam $b$ now being considered.

The areas, marked M in Fig. 12 and the corresponding areas, marked N in Fig. 13, which is contained between the zero lines and the respective sections of the curve J, are indicative of the relative amount of welding energy obtained by this control for the side seam section $c$ and the side seam sections $f$. Obviously, area N is smaller than area M.

From the foregoing it will now be evident that by the proper adjustments in the various switches $w$, $x$ and $y$, $z$, which adjustments have been fully provided for, and by the utilization of the various described circuits, that it is a simple matter to bring the peaks $h$, $j$, $k$, $m$, $n$ and $p$, of the biasing curves E, F to positions where it is possible to fire the tubes at points $cc$ corresponding to the natural power factor of the coupled circuits and thus eliminate initiating or switching transients. At such a point for the example given, the greatest welding energy is derived.

In this connection, another suggestion might be made. If the switch $y$ or the switch $z$ is opened or closed immediately after a voltage peak has occurred, the next peak will be shifted by that desired amount which was established during the setting of the sliding contact elements 231, 232 or 233 for these switches. Such setting allows for adjustment of the grid voltage peaks over a range of substantially 180 electrical degrees so that welding power pulses of from nearly zero value to maximum may be obtained.

It is thus possible to start welding at some predetermined power input, as for the seam section $f$, change to another power input, as for $g$, change again for section $c$ and change back again through the reverse order, all within the time required to weld one piece of work. Such power change is timed in with the movement of the electrode 31, all without detrimental disturbances in the welding circuit, producing the desired conditions in the several sections of the welding seam.

It will be understood that even though a resistance type of phase shifter has been illustrated in Fig. 11 and described herein, the claims of the invention are not limited to this type of phase shifting circuit as there are other forms of phase shifting devices such as varied or variable inductors and varied or variable capacitors, or these elements in combination, or in combination with varied or variable resistors.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a welding apparatus for electrically welding metallic seams having sections arranged in a given pattern and requiring different welding treatments, the combination of an electrode for traversing the seam sections, means for maintaining relative movement between the seam and said electrode, an electrical welding circuit for energizing said electrode having conducting ignitron tubes and firing tubes and a phase-shifting circuit for effecting an uninterrupted heat input of variable magnitude during said relative seam and electrode movement, means comprising switch elements located in said welding circuit for varying the magnitude of the heat input during the welding cycle by controlling the phase-shifting circuit of said welding circuit, and means operated by said motion-maintaining means for actuating said switch elements to vary said heat input in a pattern corresponding with the welding requirements of said seam sections.

2. In a welding apparatus for electrically welding metallic seams having sections arranged in a given pattern and requiring different welding treatments, the combination of an electrode for traversing the seam sections, means for maintaining relative movement between the seam and said electrode, an electrical welding circuit for energizing said electrodes having conducting ignitron tubes and firing tubes and a phase-shifting circuit for effecting an uninterrupted heat input of variable magnitude during said relative seam and electrode movement, means located in said welding circuit for varying the magnitude of the heat input during the welding cycle by controlling the phase-shifting circuit of said welding circuit, and means operated by said motion-maintaining means for actuating said magnitude varying means to vary said heat input in a pattern corresponding with the welding requirements of said seam sections.

HAROLD T. ODQUIST.